US00RE44900E

(19) United States
(12) Reissued Patent
Goetz et al.

(10) Patent Number: US RE44,900 E
(45) Date of Reissued Patent: May 20, 2014

(54) BOTTLE

(75) Inventors: Vernon N. Goetz, Villa Hills, KY (US); Sunil S. Shah, York, PA (US); Sheldon E. Yourist, York, PA (US); Eric Ungrady, Mt. Wolf, PA (US)

(73) Assignee: SD IP Holdings Company, Cincinnati, OH (US)

(21) Appl. No.: 29/375,923

(22) Filed: Sep. 29, 2010

Related U.S. Patent Documents

Reissue of:
(64) Patent No.: Des. 577,592
Issued: Sep. 30, 2008
Appl. No.: 29/266,588
Filed: Sep. 25, 2006

(51) LOC (10) Cl. ..... 09-01
(52) U.S. Cl.
USPC ..... D9/541; D9/542; D9/560
(58) Field of Classification Search
USPC ..... D9/530, 541–542, 546, 549, 553, 558, D9/560, 566, 569, 572–574, 686–687, 694
See application file for complete search history.

(56) References Cited

U.S. PATENT DOCUMENTS

| | | | | | |
|---|---|---|---|---|---|
| D46,285 | S | * | 8/1914 | Mackenzie | D9/560 X |
| D141,569 | S | * | 6/1945 | Adlerbert | D9/541 |
| D178,273 | S | * | 7/1956 | Blunt | D9/541 |
| D178,274 | S | * | 7/1956 | Blunt | D9/560 X |
| D275,455 | S | * | 9/1984 | Glaser | D9/560 |
| D345,506 | S | * | 3/1994 | Potts et al. | D9/572 X |
| D353,542 | S | * | 12/1994 | Beaver | D9/541 |
| D380,158 | S | * | 6/1997 | Olivares et al. | D9/541 |
| D413,265 | S | * | 8/1999 | Hestehave et al. | D9/541 |
| D462,274 | S | * | 9/2002 | Potts et al. | D9/558 |
| D468,212 | S | * | 1/2003 | Wasson et al. | D9/541 |
| D468,645 | S | * | 1/2003 | Nelson et al. | D9/560 |
| D478,289 | S | * | 8/2003 | Dean et al. | D9/542 |
| D488,060 | S | * | 4/2004 | Yourist | D9/560 X |
| D502,403 | S | * | 3/2005 | Chirico | D9/542 |
| D507,489 | S | * | 7/2005 | Chirico | D9/542 |
| D521,390 | S | * | 5/2006 | Andoh | D9/542 |
| D523,755 | S | * | 6/2006 | Considine et al. | D9/560 |
| D542,668 | S | * | 5/2007 | Arthur et al. | D9/560 |
| D542,669 | S | * | 5/2007 | Arthur et al. | D9/560 |
| D564,890 | S | * | 3/2008 | Coley et al. | D9/541 |
| D568,170 | S | * | 5/2008 | Prini | D9/542 X |
| D598,774 | S | * | 8/2009 | Schlies et al. | D9/541 |

* cited by examiner

*Primary Examiner* — Phillip S Hyder
(74) *Attorney, Agent, or Firm* — McDermott Will & Emery LLP

(57) CLAIM

The ornamental design for a bottle, as shown and described.

DESCRIPTION

FIG. 1 is a perspective view of the new design of the present invention;
FIG. 2 is a front elevational view thereof;
FIG. 3 is a top plan view thereof; and,
FIG. 4 is a bottom plan view thereof.
The broken lines shown in the drawings are for environmental purposes only and form no part of the claimed design.

1 Claim, 2 Drawing Sheets

Figure 2:
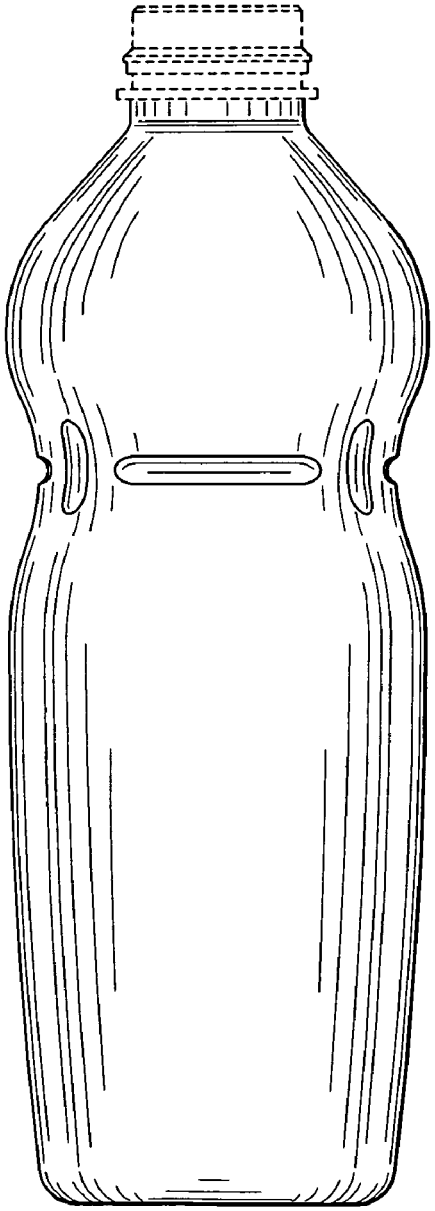
Figure 3:
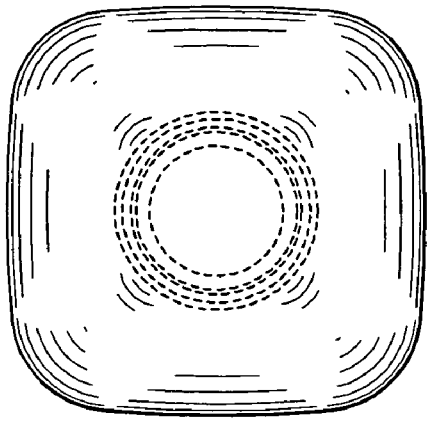
Figure 4:
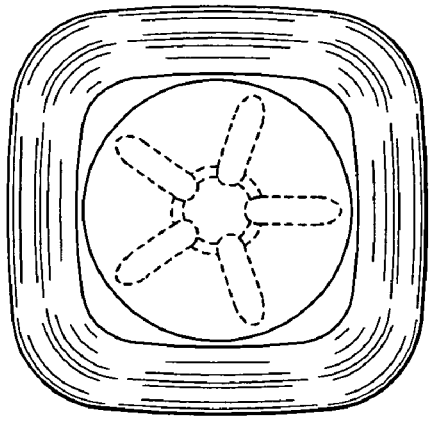

Matter enclosed in heavy brackets [ ] appears in the original patent but forms no part of this reissue; matter printed in italics indicates the additions made by reissue.

*(Amended)*

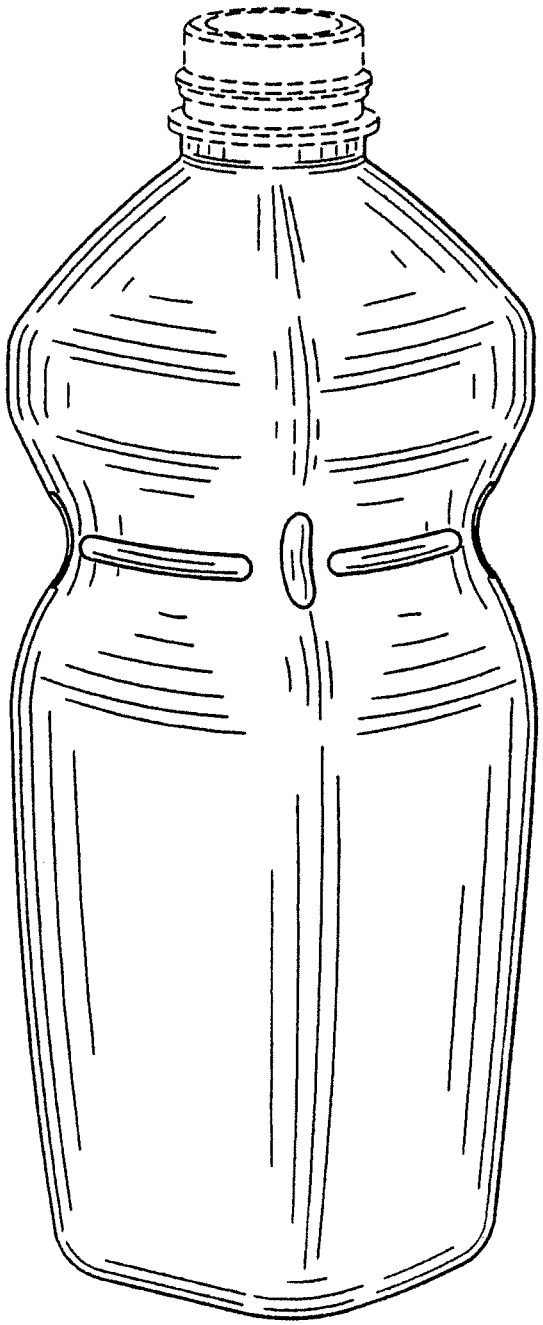

FIG. 1
*(Amended)*